United States Patent [19]
Davis et al.

[11] 3,952,204
[45] Apr. 20, 1976

[54] FILM HOLDER FOR RADIOGRAPHING TUBING

[75] Inventors: Earl V. Davis; Billy E. Foster, both of Oak Ridge, Tenn.

[73] Assignee: The United States of America as represented by the United States Energy Research and Development Administration, Washington, D.C.

[22] Filed: Jan. 14, 1975

[21] Appl. No.: 541,023

[52] U.S. Cl. 250/475; 250/482
[51] Int. Cl.² ............................................ G03B 11/00
[58] Field of Search .......... 250/475, 480, 481, 482, 250/358 T

[56] References Cited
UNITED STATES PATENTS

| | | | |
|---|---|---|---|
| 2,494,740 | 1/1950 | Boucher | 250/475 |
| 2,905,824 | 9/1959 | Thielsch | 250/475 |
| 2,922,047 | 1/1960 | Tour | 250/475 |
| 3,119,015 | 1/1964 | Kollock | 250/475 |
| 3,168,647 | 2/1965 | Kollock | 250/475 |
| R25,079 | 11/1961 | Kollock | 250/475 |

*Primary Examiner*—Alfred E. Smith
*Assistant Examiner*—B. C. Anderson
*Attorney, Agent, or Firm*—Dean E. Carlson; David S. Zachry; Louis M. Deckelmann

[57] ABSTRACT

A film cassette is provided which may be easily placed about tubing or piping and readily held in place while radiographic inspection is performed. A pair of pre-curved light-impervious semi-rigid plastic sheets, hinged at one edge, enclose sheet film together with any metallic foils or screens. Other edges are made light-tight with removable caps, and the entire unit is held securely about the object to be radiographed with a releasable fastener such as a strip of Velcro.

2 Claims, 3 Drawing Figures

U.S. Patent April 20, 1976 3,952,204
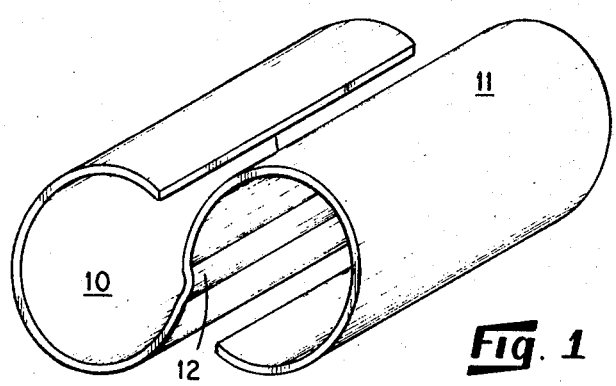
Fig. 1
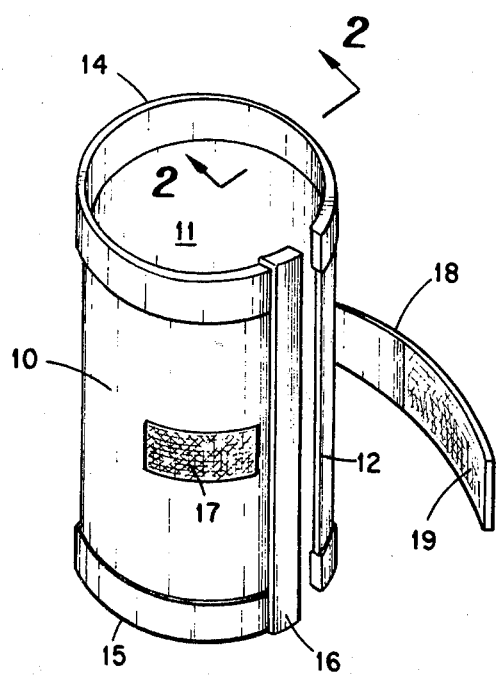
Fig. 2
Fig. 3

FILM HOLDER FOR RADIOGRAPHING TUBING

BACKGROUND OF THE INVENTION

This invention was made in the course of, or under, a contract with the United States Atomic Energy Commission.

Radiography is a conventional nondestructive method for examining girth welds in pipe and other cylindrical objects. It is conventional practice to place x-ray film, for example, against the outer surface of an object being radiographed and to insert a radiographic source along the axis of the object to a position beneath the film. When practiced with large pipe or other cylinders, the placement of the film is relatively fast. Also, because of the distances involved between a central source and the concentric film, slight gaps between film and pipe surface are of little consequence.

The radiography of small tubes, particularly when formed into bundles as in a heat exchanger, is more difficult. In particular, the placement of film becomes more critical in that the film must be in contact with the surface of the tubing because the source-to-film spacing is small. The size of the tubing and the close relationship of other tubes compounds the problem.

In one prior art device, a clamp-type film holder was placed about the welded region. The radiographic film, in a light-tight cover, was then fed through a slot in the holder so as to pass the film around the circumference of the tube. Certain disadvantages of that device include potential scratching of the film, a limitation of inspection to the outermost tubes of any bundle of tubes, and the inability for interchange of different intensifying screens.

The present invention was conceived to overcome the above disadvantages in a manner to be described hereinbelow.

SUMMARY OF THE INVENTION

It is the principal object of the present invention to provide a film holder for the radiographic inspection of circumferential welds in piping.

It is another object of the present invention to provide a film holder into which may be placed radiographic film together with any desired enhancing screens or radiation shields without any physical damage to the film.

It is also an object of the present invention to provide a film holder that may be readily and releasably attached to tubes of a heat exchanger device where no tube end is accessible for placement of a holder.

The above objects have been accomplished in the present invention by providing a film holder comprising a pair of opaque plastic cylindrical members, each being slit longitudinally, and being joined to each other at one slit edge thereof by means of a flexible hinge so as to permit one of the members to be folded into the interior of the other member such as to secure a sheet of film between the members when thus folded. A pair of opaque plastic slotted cylindrical end caps, each having one open end, are fitted over the respective ends of the folded members, and an opaque plastic longitudinal cap is fitted over the other slit edges of said members and the open ends of said end caps thereby effecting a light-tight enclosure for said film, and means are provided for releasably holding the assembled film holder about a piece of piping being inspected during exposure to a radiographic source.

BRIEF DESCRIPTION OF THE DRAWINGS

FIG. 1 is an isometric view of the body portion of the film holder of the present invention;

FIG. 2 is a partial cross-sectional view of the film holder illustrating an end closure for the body of FIG. 1, when folded, and the position of the film within the body portion; and FIG. 3 is an isometric view of a completely assembled film holder of the present invention together with a typical means for retaining the holder in position on a tube during radiographic inspection.

DESCRIPTION OF THE PREFERRED EMBODIMENT

Referring now to FIG. 1, a body portion of the film holder of the present invention is formed from a pair of generally cylindrical members 10 and 11, each being slit longitudinally and being joined to each other with a flexible hinge 12 so as to permit member 11 to be folded into the interior of member 10. The members 10 and 11 preferably are formed from opaque plastic such as semirigid polyvinyl chloride. The hinge 12 may be a fold in the plastic used to form the members 10, 11 or it may be an opaque type material overlying the appropriate edges of the members 10, 11. When member 11 is folded into the interior of member 10, it may be seen that a sheet of film together with other desired sheet materials may be secured therebetween. This is illustrated in cross section in FIG. 2. This view shows how a slotted opaque plastic end cap 14 is provided to maintain body members 10, 11 with a film 13 therebetween, in juxtaposition and to seal the ends of the body portion against light infiltration. A second slotted opaque plastic cap 15 (see FIG. 3) closes the second end of the folded body portion against light infiltration. End caps 14, 15 each are closed at one end and have an open end.

FIG. 3 illustrates the completed film holder and shows where the section of FIG. 2 is taken. A third cap 16 is used to make the final edge of the film holder light-tight. As in the case of caps 14, 15, the cap 16 is formed from an opaque rigid plastic, and each cap slips onto the body for easy application or removal in the dark room for the loading or unloading of film. Cap 16 covers the open ends of end caps 14, 15 when assembled.

FIG. 3 also illustrates one embodiment of a quick release means for retaining the film holder in place during an exposure. This includes a tab 17 of looped material attached to the exterior of member 10 and an encircling strap 18 attached at one end to the member 10 and carrying on its other end a hooked surface 19 to engage with the tab 17. These components are known in the trade as Velcro. Other quick-release mechanisms could be utilized in place of the Velcro, if desired, such as the banding materials often used for securing groups of wires and the like.

As stated above, the present invention construction is amenable to the inclusion of metallic screens as are often desired for improving radiographic images. Screens of desired materials, e.g., lead oxide, may be inserted with the film. In addition, absorber materials such as lead may be inserted as a foil or as an inclusion in the body member 10 to reduce external radiation during operation of the radiographic source.

In a normal utilization of the present invention, film and any desired screen or absorber is loaded into the film holder in a dark room. This is accomplished by placing the film on the inner surface of body member 10 and then folding body member 11 into place to clamp the film therebetween. Caps 14, 15 are applied to the ends of the folded body members, and cap 16 to the remaining open edge of the body to complete the light seal. The unit may then be removed from the dark room for use. It is placed about a pipe or tube at an appropriate location and strap 18 is engaged with tab 17 to secure the holder against the pipe or tube. By introducing a radiographic source within the pipe or tube, the radiation of the source penetrates the wall of the pipe or tube to expose the film so as to indicate the quality of the wall or of a circumferential weld in the wall. The holder is then removed and taken to a dark room where the film is removed and developed.

This invention has been described by way of illustration rather than by limitation and it should be apparent that it is equally applicable in fields other than those described.

What is claimed is:

1. An improved film holder for the radiographic inspection of circumferential welds in piping comprising a pair of opaque plastic semi-rigid cylindrical members each being slit longitudinally, said members being joined to each other at one slit edge thereof by means of an integral, flexible opaque hinge so as to permit one of said members to be folded into the interior of the other member such as to secure a sheet of film and other desired sheet materials between said members when thus folded, a pair of opaque plastic slotted cylindrical end caps, each having an open end and adapted to be fitted over the respective ends of said members when folded, a longitudinal opaque plastic cap adapted to be fitted over the other slit edges of said members and the open ends of said end caps thereby effecting a light-tight enclosure for said film, and means for releasably holding said film holder about a piece of piping being inspected during exposure to a radiographic source.

2. The film holder set forth in claim 1, wherein said members and caps are constructed from polyvinyl chloride.

* * * * *